United States Patent
Augspurger

[11] Patent Number: 6,070,894
[45] Date of Patent: Jun. 6, 2000

[54] ARM-POWERED WHEELED VEHICLE WITH BICYCLE-TYPE CRANKS

[76] Inventor: Michael Wayne Augspurger, 221 Pine St., Florence, Mass. 01062

[21] Appl. No.: 08/933,557

[22] Filed: Sep. 19, 1997

[51] Int. Cl.⁷ ........................................................ B62M 1/14
[52] U.S. Cl. .......................... 280/249; 280/282; 280/266
[58] Field of Search .............................. 280/22.1, 266, 280/267, 249, 250, 282, 288.1, 271, 272

[56] References Cited

U.S. PATENT DOCUMENTS

| | | |
|---|---|---|
| 484,712 | 10/1892 | Hartley . |
| 551,814 | 12/1895 | East ........................ 280/250 |
| 1,268,310 | 6/1918 | Wilkinson . |
| 1,483,321 | 2/1924 | Thompson ................ 280/249 |
| 3,042,131 | 7/1962 | Dovci ...................... 280/250 |
| 3,485,508 | 12/1969 | Hudnall .................... 280/234 |
| 3,485,510 | 12/1969 | Merlan ..................... 280/250 |
| 3,823,959 | 7/1974 | Winters .................... 280/234 |
| 3,848,891 | 11/1974 | Vittori ..................... 280/250 |
| 3,854,754 | 12/1974 | Jablonski ................ 280/242 R |
| 4,109,927 | 8/1978 | Harper ..................... 280/250 |
| 4,132,435 | 1/1979 | Wilson ..................... 280/266 |
| 4,152,005 | 5/1979 | Vanore ..................... 280/234 |
| 4,248,448 | 2/1981 | Dmitrowsky ............... 280/261 |
| 4,279,429 | 7/1981 | Hopkins et al. ............ 280/267 |
| 4,417,742 | 11/1983 | Intengan ................... 280/234 |
| 4,858,942 | 8/1989 | Rodriguez ................. 280/233 |
| 4,976,451 | 12/1990 | Kamenov ................. 280/226.1 |
| 5,022,671 | 6/1991 | Jones, Jr. ................. 280/250 |
| 5,028,064 | 7/1991 | Johnson ................. 280/250.1 |
| 5,209,506 | 5/1993 | Klopfenstein ............. 280/240 |
| 5,263,732 | 11/1993 | Harmeyer ................ 280/288.1 |
| 5,282,640 | 2/1994 | Lindsey ................... 280/234 |
| 5,354,084 | 10/1994 | Lofgren et al. ............ 280/250 |
| 5,385,359 | 1/1995 | Ehrbar .................... 280/234 |
| 5,465,989 | 11/1995 | Grove ..................... 280/250 |
| 5,732,964 | 3/1998 | Durham et al. ............ 280/266 |
| 5,853,184 | 12/1998 | Lofgren et al. .......... 280/242.1 |

*Primary Examiner*—Paul N. Dickson
*Assistant Examiner*—Avraham H. Lerner

[57] ABSTRACT

An arm-powered wheeled vehicle that supports a rider in a prone or kneeling position to use crank arms radially displaced by 180 degrees to influence rear propulsion. Using this rider positioning and crank system maximizes the relatively low power available from the human body. Further, providing two steering devices and a wide range of gears allows the use of this arm-powered vehicle for traveling over varied terrain with the greatest possible control and safety.

14 Claims, 5 Drawing Sheets

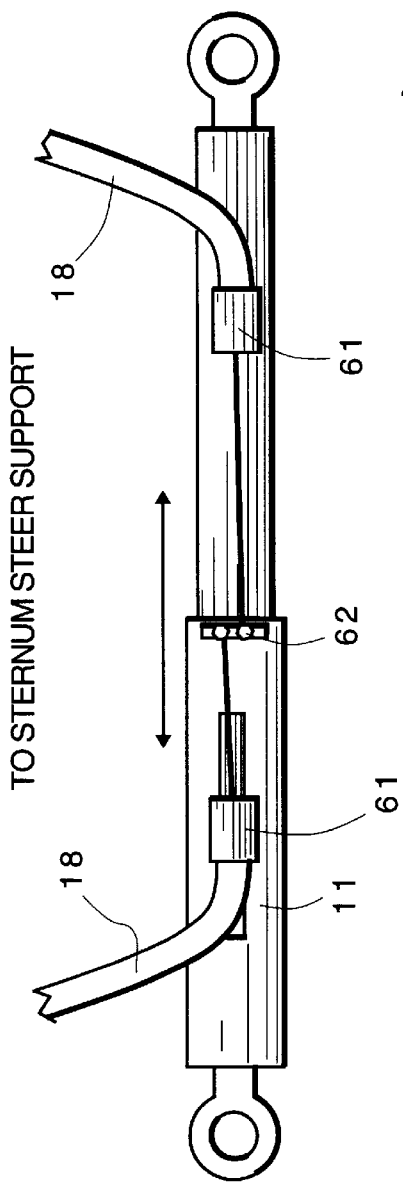
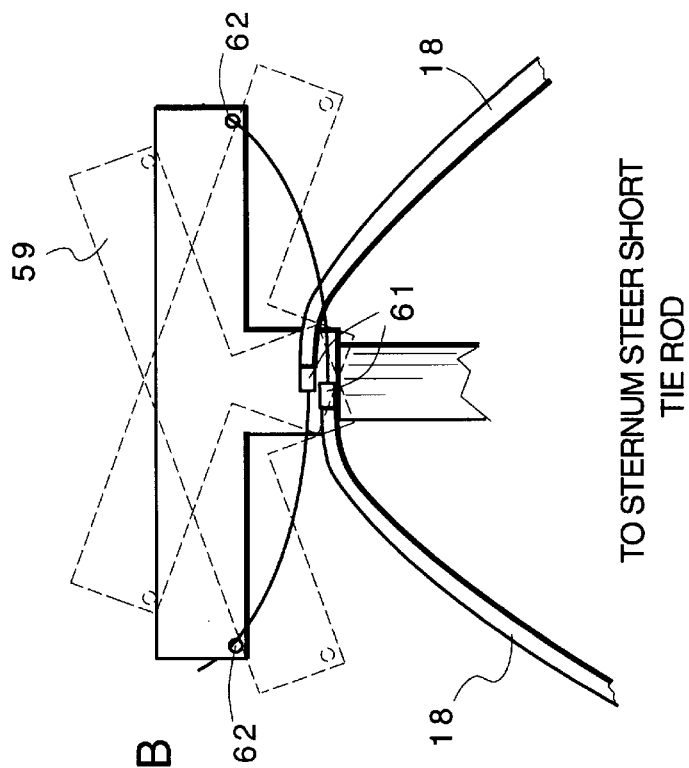

ARM-POWERED WHEELED VEHICLE WITH BICYCLE-TYPE CRANKS

BACKGROUND—FIELD OF THE INVENTION

This invention relates to wheeled vehicles, particularly to such vehicles which are arm powered and are designed to increase the safety, mobility, speed, and travel range of a rider.

BACKGROUND—DESCRIPTION OF PRIOR ART

People use human-powered vehicles (such as bicycles or wheelchairs) as a means of recreation and transportation. Riders who wish to use their arms to invigorate the upper body, or those with inactive legs, use their arms to power certain types of these vehicles. As such, all highperformance, arm-powered vehicles must be carefully designed because of the relatively low amount of power a rider's arms can provide. Thus, to make the most efficient use of the rider's arm-strength, an arm-powered vehicle, in addition to being lightweight and having low rolling resistance, must use the best possible propulsion method, and position the rider in the best possible way.

Methods of Propulsion—Pushring

The methods of propelling arm-powered vehicles currently fall into three categories: pushring, lever drive, and bicycle crank. Pushring is the most common and familiar method of propulsion for arm-powered vehicles. The everyday wheelchair has a pushring concentric with and near each tire since the pushrings are more convenient and cleaner to grasp than the tire. However, 150-years ago bicycles were propelled by paddling the feet along the ground. Today wheelchair users are no better off than those ancient bicycle riders since they must employ a similarly antiquated method of propulsion. As such, all the racing wheelchairs, and even the new "all terrain" wheelchair for downhill racing, are a hindrance to a rider due to such relatively poor speed and climbing ability. Therefore, pushrings should not be used for optimal efficiency in an arm-powered vehicle.

Lever-Drive

Lever-drive propulsion occurs by transferring the reciprocating swing of a lever arm into the rotary motion required for powering a drive wheel. U.S. Pat. No. 5,282,640 to Lindsey, Feb. 1, 1994, discloses a lever drive system where one or two lever arms drive a wheel or wheels with a cable, chain, or second lever. Many factors make the lever drive unacceptable. The reciprocating motion, which causes power to occur intermittently, creates unavoidable "dead spots" in the power delivery. The stop-start reciprocating motion forgoes the advantageous use of the inertia of the drive system. In other words, the mass in the drive train (cranks, chain, sprockets), instead of providing some beneficial flywheel effect, now has to be stopped and started with each stroke. The lever drive system is incompatable with the most efficient rider position, which is prone. If the rider leans forward onto the drive levers in order to unweight or lift out of the saddle, the levers simply fall to the bottom of their stroke and offer nothing to pull up against. Finally, the lever drive system shifts gears much less fluidly than modern bicycles. Therefore, a lever drive should not be employed in an arm-powered vehicle due to the compromise in rider positioning and the waste in energy.

Bicycle-Type Cranks

The remaining prior-art arm-powered vehicles use bicycle cranks and gears. This type of power system currently holds all the speed and distance racing records because it allows a rider to both conveniently access a wide range of gears and to exploit the fluid, continuous, spinning motion inherent in bicycle-type cranks. It is that smooth, uninterrupted spinning motion that makes the most efficient use of all available power.

Currently, there are two popular ways of orienting bicycle cranks: "synchronous", where the hands essentially work in tandem, and "opposed", as in a conventional bicycle. U.S. Pat. No. 484,712 to Hartley, Oct. 18, 1892, U.S. Pat. No. 3,485,508 to Hudnall, Apr. 18, 1968, as well as nearly all currently available hand-cycles, use the synchronous crank orientation. They are forced to use this crank positioning because of an unfortunate connection between the crank orientation and the method of steering. To steer these vehicles a rider shifts weight from side to side, either by leaning on a center pivot, or pivoting the front wheel on bearings like a bicycle. However problems with these vehicles arise in high rpm and high power situations. In those conditions, if the cranks are opposed, the rider's weight inevitably moves side to side with each stroke of the cranks. This weight shift causes these vehicles to travel down the road in a zig-zag motion. Thus they are forced to use synchronous crank orientation. U.S. Pat. No. 3,848,891 to Vittori, Nov. 19, 1974 describes this phenomenon. The following is a quotation from Vittori, "Additionally, the application of uneven force at either hand causes unwanted turning of the front wheel." This zig-zag is undesirable, both because it is a safety hazard and because it makes racing inefficient. Also it is unsafe since it unbalances the rider, and increases the likelihood of flipping at high rpms. Also, zig-zag is unacceptable for racing because it slows the vehicle by causing a longer travel path and tire rub.

Bicycle-type cranks oriented in the opposed position are the best propulsion system both for power delivery and for control of the vehicle. U.S. Pat. No. 4,109,927 to Harper, Aug. 29, 1978, and U.S. Pat. No. 5,022,671 to Jones, Jun. 11, 1991, are examples of opposed-crank vehicles whose designers have attempted to avoid unwanted zig-zag by adding excessive amounts of trail or self centering effect to the steering geometry and/or a heavy spring load to center. However, this solution severely compromises the ability to crank and steer simultaneously. Also, to some degree, under high power these vehicles still zig-zag. U.S. Pat. No. 4,152,005 to Vancore, May 1, 1979, and the above Vittori patent show examples of opposed-crank vehicles whose designers have attempted to avoid unwanted wiggling by positioning the cranks far from the steering pivot on the end of a long tiller. These vehicles still suffer from the above problems. Other examples in the prior art are U.S. Pat. No. 4,858,942 to Rodriguez, Aug. 12, 1988, U.S. Pat. No. 3,485,510 to Merlan, Dec. 23, 1969, U.S. Pat. No. 3,823,959 to Winters, Jul. 16, 1974, U.S. Pat. No. 3,854,754 to Jablonski, Dec. 17, 1974, and U.S. Pat. No. 1,268,310 to Wilkinson, Jun. 4, 1918, which do nothing to stop unwanted zig-zag and consequently are nearly unrideable. Thus prior-art bicycles and wheelchairs offer very poor performance.

Wheel Configuration

Every possible arrangement of two to four wheels can be found in the prior art. However, almost all currently available hand-cycles are of the same wheel configuration. They use front wheel drive with one wheel in front and two in the rear. Any vehicle with this configuration suffers from the following problems.

Their climbing traction is limited. On a steep climb, there is an inevitable weight transfer off of the front wheel and onto the rear. With front wheel drive, the front wheel cannot get traction and simply spins in place.

Their high speed cornering is severely limited, even dangerous, because of the inherent weight transfer to the outside wheels while cornering. These hand-cycles place an excessive loading on their outside rear tire, thus resulting in an "over-steering" condition. An "over-steering" vehicle tends to "spin-out". In contrast, an "understeering" vehicle will "push" or "plow" its front wheels into the turn, which is far safer.

Their braking capability is also severely impaired, even dangerous. Because of the inherent weight transfer to the front wheel or wheels during braking, these vehicles place the greatest demand for brake performance and tire-adhesion on their single front wheel. The clearest case, where these vehicles become truly dangerous, is when a high speed turn is combined with hard braking. Under these conditions, tipover to the outside and forward is all too obvious and common.

In order to mitigate the above cornering and braking problems, these vehicles compromise their low speed maneuverability by designing their steering geometry to favor stability at speed. This slowed steering is a partial solution to the dangerous cornering inherent in this wheel configuration, but it results in an overly large, cumbersome turning radius. The space required to turn around is so large that the entire character of the riding experience is diminished. This is clearly shown in a promotional video from LIGHTENING HAND-CYCLES, 1997, 360 Sepulveda Blvd., Suite 1030, El Segundo, Calif. 90245. This video demonstrates a "twelve point turn" which shows just how cumbersome their turning radius is.

In spite of this awkwardly slow steering, these vehicles still have no inherent high-speed, self-centering effect. Users of a hand-cycle sold under the trademark FREEDOM-RYDER by Brike International Ltd. of 20589 S.W. Elkhorn Ct., Tualatin, Oreg., 97062, since 1994, experience well known wobbles, crashes, and injuries.

Two wheeled embodiments such as shown in U.S. Pat. No. 5,465,989 to Grove, Nov. 14, 1995, are no better because of the recumbent riding position which severely compromises the handling and the power delivery.

Rider Positioning

The leg powered able bodied bicycle world has two camps when it comes to riding position—upright and recumbent. For the purposes of this discussion, in an upright riding position the rider's weight or center of gravity is essentially straight above the cranks. This preferred rider position has remained unchanged since the earliest "high wheeler" bicycles popular in the 1800s.

Today's racing cyclists and frame builders refer to upright positioning in extremely exact dimensions. Commonly referred to as "seat lube angle" it is a measurement of the angle formed between the level ground and the back of the seat tube. The range of seat tube angles commonly used varies from a steep angle of 80 degrees (triathlon or time trial bike) to a slack angle of 65 degrees (beach cruiser). The fact that only fifteen degrees covers the entire range in seat tube angles demonstrates how important the best seat position for power delivery is to a sophisticated cyclist.

A recumbent riding position is one where the rider's weight is significantly behind the cranks. A recumbent position is used to either get aerodynamically lower to the ground or to more comfortably place body weight on the saddle as opposed to on the handlebars and cranks. The seat angles commonly used on recumbent bicycles range from a high and low of about 20 degrees to either side of horizontal.

All current hand cycles use the recumbent position. Pushring racers and sports chairs, such as those used for tennis or basketball, allow the rider to lean forward for maximum power delivery, but hand cycles are strictly recumbent. In these, the riders all lean back to some degree, never leaning forward past the vertical. This is because of the previously mentioned steering method that dictates a synchronous crank orientation. To lean forward into a prone position with the synchronous crank orientation would be problematic. A resultant bobbing up and down is awkward and tends to get disabled riders "stuck" down at the bottom of the stroke.

Therefore, two of the most important aspects of today's racing bicycles are as follows: One, opposed cranks which allow a fluid spin of the muscles to drive the cranks while in opposition to each other, and two, the upright rider position and all of its advantages, are not available to today's hand-cyclists The most sophisticated prior art hand-cycle that uses both the prone rider position and the opposed bicycle type cranks is shown in the above patent to Jablonski. It has a method of switching the crank orientation from opposed to synchronous and back again. Notably, Jablonski prefers the opposed position for providing propulsion to the vehicle. When the synchronous position is engaged for steering, the rider looses ability to rise up off the seat. Thus a rider would either tend to take bumps directly into their torso or swing out at the bottom of the crank stroke with both hands down. Due to the wheel configuration (one in front, two rear) this vehicle has severely impared cornering and braking capabilities. Also, Jablonski has no capability to access the range of gears needed for all terrain use. Most importantly with Jabloski, the center of rotation of the hand crank mechanism is in alignment with the vertical turning axis of the front wheel. Thus, this vehicle is subject to severe wiggling or weaving down the road during high rpm cranking when the cranks are in the opposed position. Even if this problem were fixed, he has no secondary steering method and would be left with no steering.

Performance Comparison

The aerodynamic advantage that recumbent bicycles hold over upright bicycles does not apply to hand cycles. All serious hand-cycle designs are equally low to the ground. Even though recumbents hold all the speed records on the track and on level ground, in all other situations, upright bicycles are faster. This is particularly clear in climbing hills where aerodynamics is less important and maximum utilization of the rider's available muscles is crucial. As a result, recumbent bicycles have a slow and labored feel.

On a steep climb with a conventional bicycle, even a rider who is sitting uses their upper body. The most extreme situation is on a steep climb in too high of a gear, a familiar problem to almost anyone who has ridden a bicycle. In this situation the rider's leg muscles simply cannot do the job. However, rising out of the saddle, pulling on the handlebars, and swaying the upper body from side to side makes all the difference. Even in the less extreme case, as on a moderate climb, an observant rider in the saddle will notice the constant use of the grips, and the weight of head, arms, and torso. Therefore, the subtle but extremely sophisticated motion coming from the muscles of the neck, shoulders, arms, and hands is a large part of the propulsive motor force.

With all currently available hand cycles, the rider sits back on the seat with their legs in front of the torso and with the synchronously oriented hand cranks placed directly in front. This recumbent position places riders so far behind the cranks that they cannot use the hand grips to pull the bulk of their weight up away from the seat or saddle. The rider is unable to rise up when cranking. This inability of a rider to get out of the saddle means recumbents have less maximum force to bring to bear on he cranks, which takes away from the motive force needed for climbing. Therefore, the recumbent position should not be used in an arm-powered vehicle intended to climb hills or negotiate rough terrain.

OBJECTS AND ADVANTAGES OF THE INVENTION

Accordingly, several objects and advantages of the present invention are:

(a) to provide a hand-cranked vehicle which is analogous to the modern mountain bike.

(b) to provide a hand-cranked vehicle which uses opposed hand-cranks for propulsion, thus allowing the maximum utilization of available arm power and the best possible rider control;

(c) to provide a hand-cranked vehicle which places the rider in a head forward prone or kneeling position where the weight of the rider's upper body is generally above the cranks, thus developing maximum cranking power, and also allowing the best possible control over the vehicle;

(d) to provide a hand-cranked vehicle which allows a rider to deliver efficient power by rotating the cranks and, at the same time, steer the vehicle with precision and safety;

(e) to provide a hand-cranked vehicle which has a seating support system which is comfortable, secure, and easy to enter and exit;

(f) to provide a hand-cranked vehicle which allows a disabled rider to climb the steepest possible hills and negotiate varied terrain with the greatest speed, comfort, and safety;

(g) to provide a hand-cranked vehicle which has a turning radius that is less than the width of the average two lane road; and (h) to provide a hand-cranked vehicle which places the maximum possible amount of weight on the rear drive wheel during climbing, to improve traction.

Other objects and advantages are to provide a hand-cranked vehicle which has a wide range of gears, efficient braking, and is as lightweight, sturdy, and simple as possible.

Further objects and advantages will become apparent from a consideration of ensuing descriptions and drawings.

BRIEF DESCRIPTION OF THE DRAWINGS

FIG. 3A is a telescopic actuator with cables leading to the sternum support of the present vehicle.

FIG. 3B shows the motion of a pivoting sternum support and cables leading to telescopic tie rod of the present vehicle.

Figure 2:
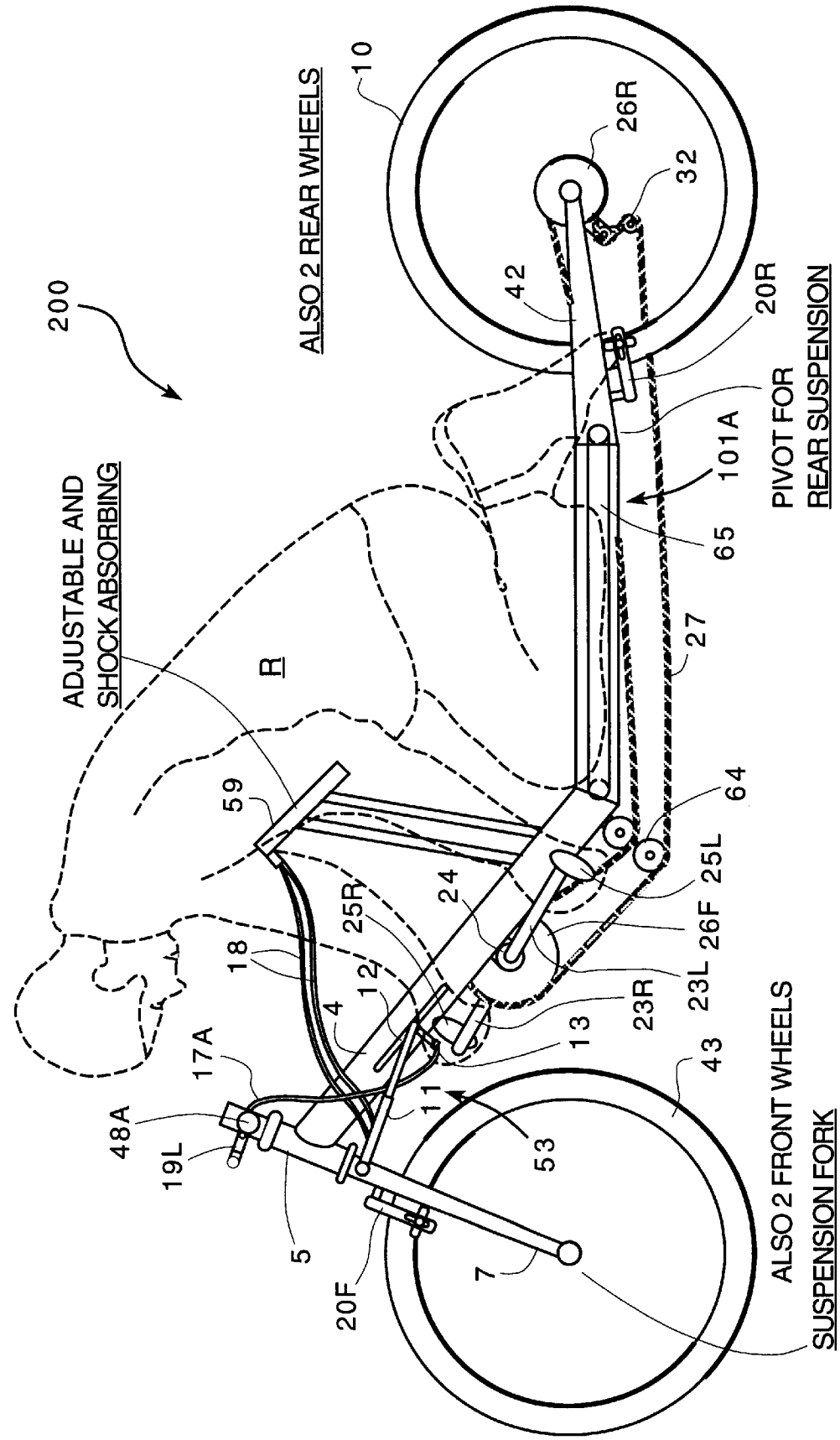
FIG. 2 is a side elevation of a two-wheeled and/or four-wheeled version of an arm-powered vehicle in accordance with the present invention with rider. This view shows rider position, and bicycle front fork frame style.

REFERENCE NUMERALS IN DRAWINGS 101-frame
101A-bent frame
5-head tube
7-front fork
10-rear wheel
11-telescopic actuator
12-slotted plate
13-spring loaded clamp
17-twist grip
17A-twist grip cable
18-sternum support cables
19L-brake lever
19R-brake lever
left crank arm
23R-right crank arm
24-crank axle
25L-left crank handle
25R-right crank handle
26F-front sprocket
26R-rear sprocket
27-chain
29-shift lever
32-rear derailleur
40-main frame member
41-front axle member
42-rear fork member
43-front wheel
43L-left front wheel
43R-right front wheel
45-tie rod
43L-left steering arm
46R-right steering arm
47L-left king pin
47R-right king pin
48A-handlebar
48L-left handlebar
48R-right handlebar
53-secondary steering system
59-sternum support
60-bushing
61-cable stops
62-cable end anchors
63-large pivoting member
64-chain guides
65-lower support
67L-left front brake
67R-right front brake
100-vehicle
200-FIG. 2 vehicle

SUMMARY

In accordance with the present invention an arm-powered wheeled vehicle comprises a frame, at least one front wheel, at least one rear wheel, a pair of opposed crank arms with their respective crank handles, a rider support for supporting a rider in a prone or kneeling position, a flexible drive to link the crank arms to the rear drive wheel, and at least one steering device to provide steering control over the vehicle.

DESCRIPTION OF THE PREFERRED EMBODIMENT

Figure 1:
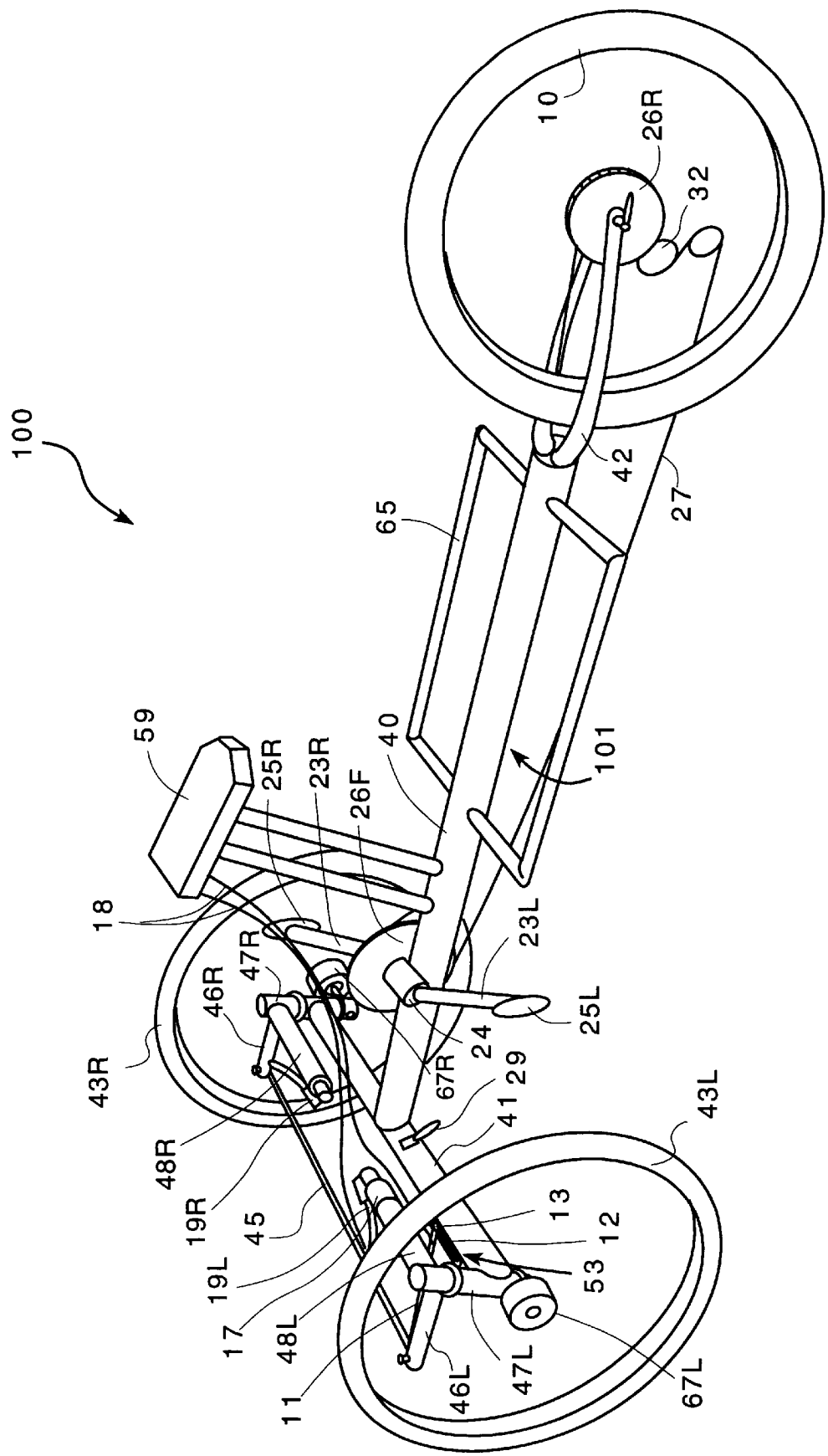
FIG. 1 is a perspective view of a prefered frame configuration of an arm-powered vehicle in accordance with the present invention.

FIG. 1 illustrates the preferred embodiment of an arm-powered vehicle of the present invention. An arm-powered vehicle 100 carries a rider disposed in a kneeling position. A substantially horizontal frame 101 with an angle of inclination of 0 to 45 degrees is preferably made from 3A1–2.5V titanium tubing. Chrome molybdenum, aluminum, or a composite material of synthetic fibers impregnated with a synthetic resin will also suffice.

Frame 101 consists of a main frame member 40 attached at its front most end to a front axle member 41. Frame 101 at is rear end attaches to a rear fork member 42. Included is a pair of axially aligned front wheels 43L and 43R rotatably and pivotably attached to the respective ends of front axle member 41. Additionally, rear fork member 42 attaches rotatably to a rear wheel 10. Pivotally attached to the ends of front axle member 41 are two substantially vertical kingpins 47L and 47R. Attached respectively to kingpins 47L and 47R at their lower ends are front wheels 43L and 43R. Further, a tie rod 45 and right and left steering arms 46R and 46L connect front wheels 43L and 43R together. Thus, front wheels 43L and 43R always pivot together as a pair.

To enable steering control, a right handlebar 48R and a left handlebar 48L are attached to the upper ends of kingpins 47L and 47R, respectively. Located on handlebars 48L and 48R are brake levers 19L and 19R, respectively. Preferably, brake levers 19L and 19R through brake cables (omitted for clarity) enable actuation of front brakes 67L and 67R disposed on front wheels 43L and 43R, respectively. Alternatively, one of brake levers 19L and 19R can actuate a brake which engages the rear wheel(s) and the remaining lever engages the front wheel(s). Therefore, the rider can in any manner effectively steer and brake vehicle 100.

A pair of bicycle-type crank arms 23L and 23R attach to a crank axle 24 that is journaled to main frame member 40 to form a rotating powering means to propel the vehicle. Additionally, a left crank handle 25L and a right crank handle 25R rotatably attach to crank arms 23L and 23R, respectively. Using a front sprocket 26F, a rear sprocket 26R, and a chain 27, the rotational force applied to crank handles 25L and 25R transmits to rear wheel 10. A shift lever 29, a shift cable (omitted for clarity), and a rear derailleur 32 provide a convenient changing of the gear ratios. Fitted on vehicle 100 is a secondary steering system 53 that enables steering control while simultaneously rotating crank arms 23L and 23R. Making up secondary steering system 53 is a telescopic actuator 11. The first end of actuator 11 attaches to the forward end of left steering arm 46L. The second end of actuator 11 attaches to a spring loaded clamp 13. In addition, welded to front axle member 41 is a slotted plate 12 on which spring loaded clamp 13 slides. In this manner spring loaded clamp 13 alternately fixes or enables free sliding of the second end of actuator 11. A twist grip 17 controls the fixing or free sliding action of clamp 13 and enables the rider to choose between two modes of steering.

Frame 101 includes a support for a rider made up of a sternum support 59 and a lower support 65. Omitted for clarity are upholstery and padding disposed on supports 59 and 65. Also sternum support 59 may be independently shock absorbing for additional comfort. Pivoting sternum support 59 operates through a pair of sternum support cables 18, which in turn extend or compress telescopic actuator 11.

Operation of Invention

Operation of the present vehicle requires a rider R to kneel on lower support 65, lean forward onto sternum support 59, and grasp crank handles 25L and 25R. Forward propulsion is achieved by using the rider's arm and upper body muscles to rotate crank arms 23L and 23R.

There are two methods of steering. By using the upper chest to push down on either side of the sternum support 59, the rider can steer while cranking. The pivoting sternum support 59 provides fine adjust steering and frees the hands for cranking. If a sharper turn or even greater control is desired, the rider can move their hands from crank handles 25L and 25R to handlebars 48L and 48R. Grasping either right handlebar 48R or left handlebar 48L and pivoting it in the intended direction of travel facilitates steering the vehicle while coasting downhill and provides the perfect mounting place for brake levers 19L and 19R.

The change back and forth between using sternum support 59 for steering and using the handlebars for steering is controlled via the activation or deactivation of spring loaded clamp 13. Rotating twist grip 17 counterclockwise relaxes tension on a twist grip cable 17A, which extends spring loaded clamp 13, allowing it to clamp onto slotted plate 12. In this fixed mode front wheels 43L and 43R are functionally linked to sternum support 59. Thus, the rider can crank at full power on crank handles 25L and 25R to propel the vehicle. Alternatively, rotating twist grip 17 clockwise pulls tension onto twist grip cable 17A, which causes compression of spring loaded clamp 13. Compressing spring loaded clamp 13 allows free movement of handlebars 48L and 48R as spring loaded clamp 13 slides freely along slotted plate 12. In this free mode, sternum support is disconnected from -steerable front wheels. Rider R can freely steer from the handlebars 48L and 48R. Additionally, this free mode allows precise steering, parking, and reversing when the rider only needs one hand to, crank, e.g., on smooth level ground.

FIG. 2—Alternative Two and Four-Wheeled Embodiment

FIG. 2 shows an alternative two-wheeled embodiment. Shown suitably mounted on vehicle 200 is a rider R. A bent frame 101A generally consists of a bent main member 40 attached to a head tube 5 at its front end and a rear fork member 42 at its rear end. The angle of bend to bent frame 101A can be zero to forty-five degrees, depending upon the needed clearance for a front fork 7 journaled to head tube 5. Also included is a front wheel 43 rotatably attached to front fork 7 as well as a rear wheel 10 rotatably attached to rear fork member 42. Additionally, front fork 7 and rear fork 42 may be independently shock absorbing. With only one front wheel 43, this embodiment has no tie rods or steering arms but steers using a conventional bicycle handlebar 48A. Secondary steering system 53 operates similarly to that of FIG. 1. The exception is attaching telescopic actuator 11 to front fork 7 and relocating slotted plate 12 onto bent main member 40, which relocates the second end of telescopic actuator 11. Lastly, vehicle 200 has a chain guide 64 due to the fairly long run of a chain 27.

FIG. 3A—Details of Secondary Steering System

FIG. 3A is a blow-up of telescopic actuator 11 showing how tension on either of sternum support cables 18 will cause it to lengthen or shorten. Similarly, FIG. 3B shows the action of pivoting sternum support 59 and how the side-to-side motion generates tension alternately on sternum support cables 18. This tensioning or de-tensioning alternately on either of sternum support cables 18 in turn lengthens or shortens telescopic actuator 11, thereby influencing steering.

Figure 3C:
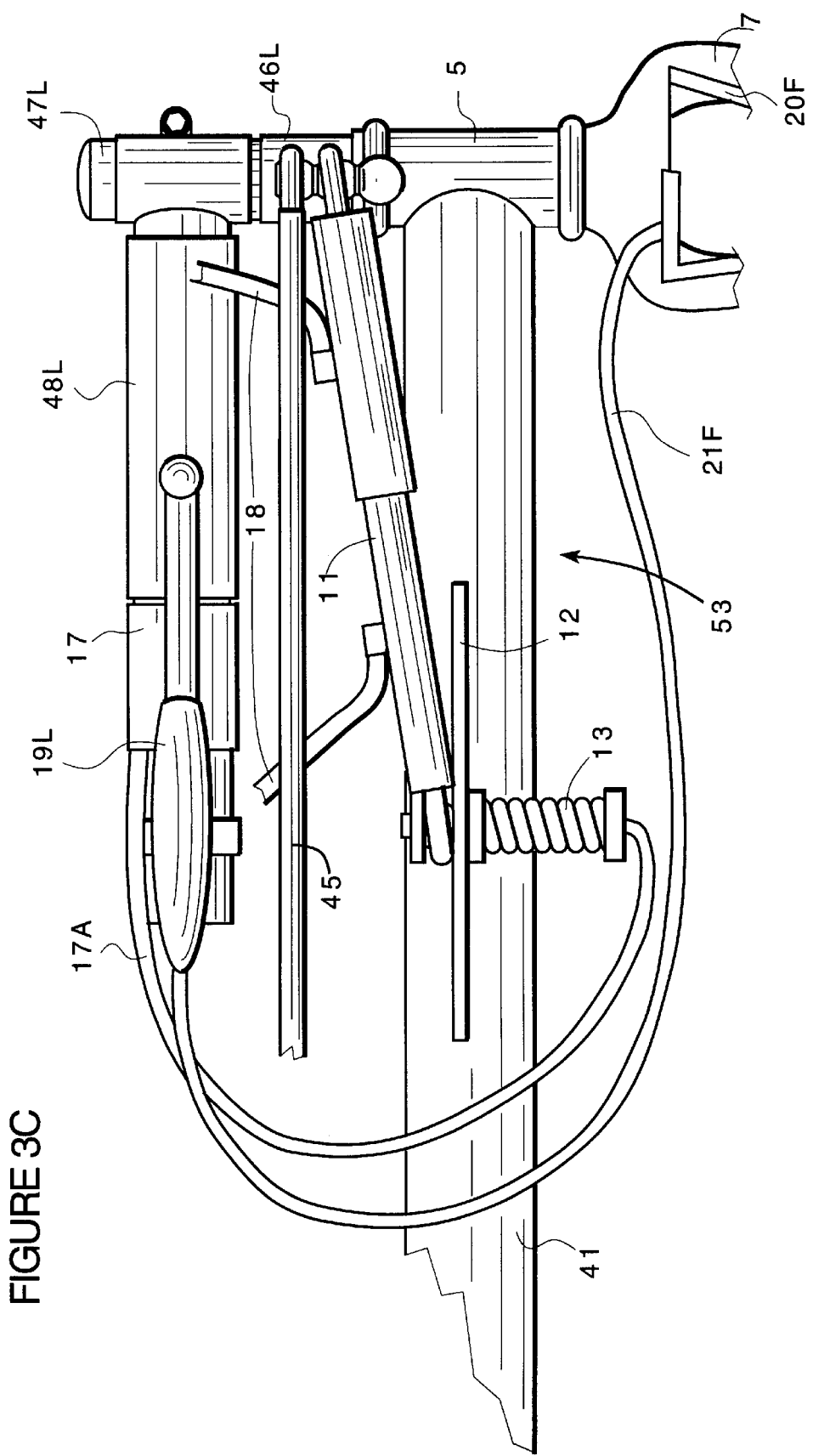
FIG. 3C is a close-up view of the left handle-bar area of the present vehicle.

FIG. 3C—Blow-Up of Left Front Corner

FIG. 3C allows a close examination of secondary steering system 53 that is common to all frame configurations.

Shown are left handlebar 48L and left steering arm 46L, and how they clamp onto left kingpin 47L. Shown also is twist grip 17 on left side handle bar 48L and its associated cable 17A that leads to the spring loaded clamp 13. The forward end of left steering arm 46L is the location for one end of telescopic actuator 11 and the left end of tie rod 45. Spring loaded clamp 13 is shown in Its clamped mode. As such, clamp 13 grips slotted plate 12. This clamping action functionally connects the steering of the front wheels, through the lengthening and shortening of telescopic actuator 11 and sternum support cables 18 to sternum support 59.

Figure 4:
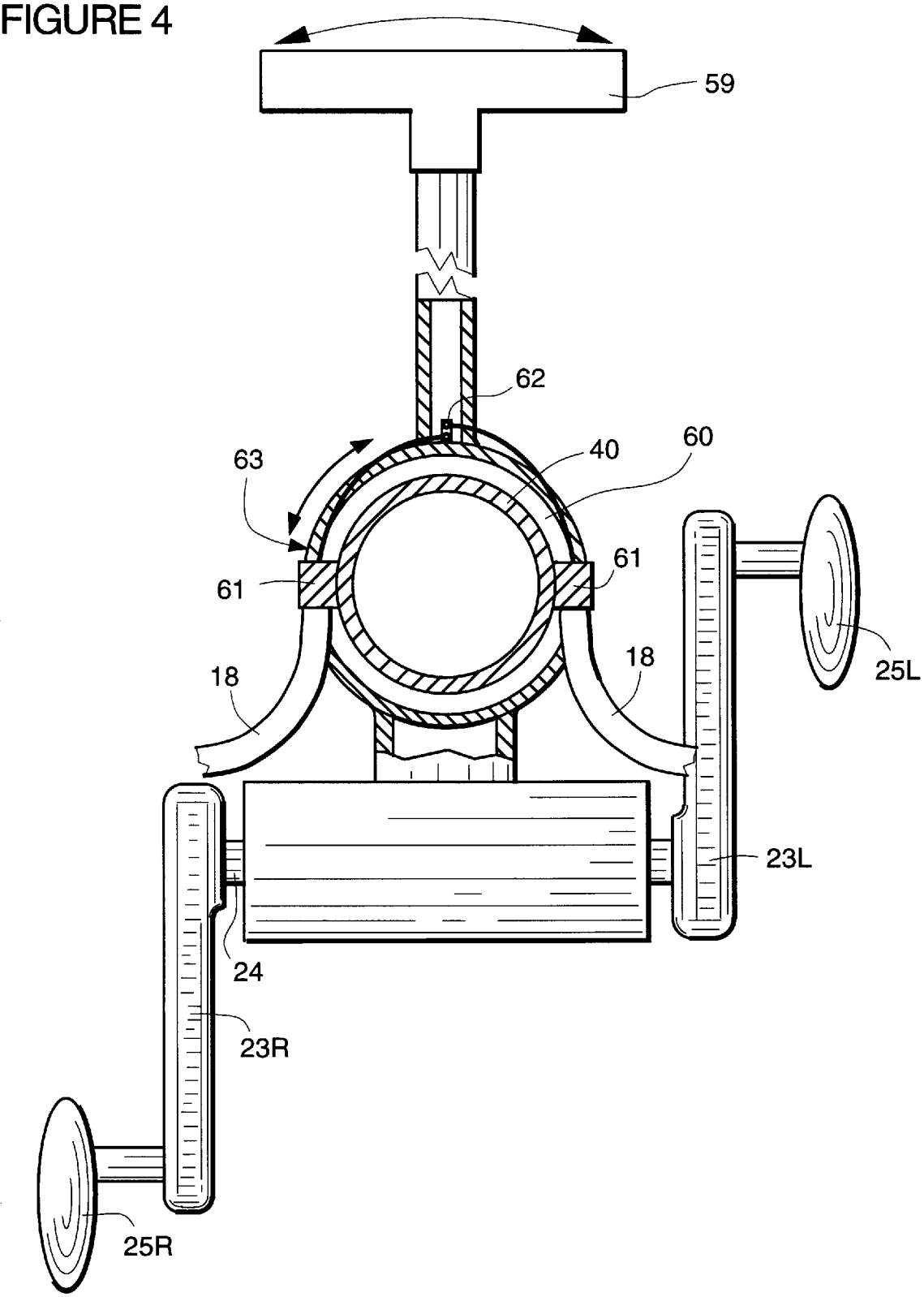
FIG. 4 shows details of an alternative steering system of the present vehicle, plus the cranks and sternum support fastened together and pivoting about the frame member as a unit.

FIG. 4—Alternative System

FIG. 4 shows an alternative secondary steering system designed for a more able-bodied rider. Crank arms 23L and 23R, and sternum support 59 are functionally fastened together, forming a large pivoting member 63 which moves together as a unit. Close examination will show that substantially horizontal main frame member 40 is the innermost circle, and is surrounded by a bearing surface or bushing 60. Bushing 60 provides the sliding surface that the large pivoting member 63 pivots around. Fastened to main frame member 40 are cable stops 61 and fastened to the large pivoting member 63 are cable end anchors 62. Therefore, moving large pivoting member 63 from side to side puts the appropriate sternum support cable 18 under tension to act on telescopic actuator 11 to enable steering. In this version the rider's hands, as well as their sternum, operate the secondary steering system. This allows more power and travel than using just sternum support 59 alone. For riders who do not have the use of the muscles of their lower trunk and hips, the motion required to operate this system is not possible without extensive seating support. For amputees or those with a very low-level spinal cord injury, this steering system can be quite useful.

Conclusion, Ramifications, and Scope of Invention

Having fully described preferred and other embodiments of the present invention, it will be apparent to those skilled in the art that numerous alternatives and equivalents exist which do not depart from the above description.

Negotiating bad terrain such as mud, snow, and sand, is particularly vital to the disabled rider. If the terrain becomes too severe, an able bodied rider can simply step out of the vehicle and walk, even carry the vehicle. The disabled rider must remain in the vehicle so the ability to steer precisely, grip with the drive wheel, and shift one's weight around for control and power becomes vital.

Opposed Cranks

Our testing confirms the widespread intuition that the opposed crank orientation is more powerful than the synchronous. With the synchronous orientation, the rider develops maximum power by pulling up and by pushing against the seat back. The remaining 180 degrees of crank rotation are relatively dead. The opposed crank orientation allows the same capability to pull up and push against the seat back, but with the additional ability to work one hand against the other. There are no significant dead spots. Far more power is developed with the hands opposed.

Additionally, this crank orientation is beneficial to the rider because the arms can absorb bumps. In a recumbent riding position, road shock is taken directly into the back and seat. With the hands opposed, a rider in the prone position can raise up away from the sternum support, much like an able bodied cyclist would "get out of the saddle".

In a three or four-wheeled vehicle that is light enough to be called powered, is energy to get out of the saddle to shift one's laterally towards the inside of a turn to prevent tipping over while cornering. There are also important riding techniques involving lunging forward and back. This motion is needed to back up or get over a curb or get unstuck from bumps, mud or snow, which is nearly impossible to accomplish while in the recumbent position.

The ability to get out of the saddle also greatly improves steering precision by allowing the use of subtle side-to-side movements of the head and shoulders to enhance directional control. This is particularly true of the two-wheeled embodiment where steering and balance are quite delicate, especially for the disabled rider.

Therefore, the present vehicle makes available some of the advantages in steering feel and power delivery that are demonstrated when comparing a recumbent to an upright bicycle.

Gear Selection

Because of the relatively low amount of power available from the human body, extremely low compound reduction gears are needed for multiplying the power on a climb. This low gearing can be achieved via currently available bicycle technology involving multiple front and rear drive sprockets and their respective derailleurs. A rear hub with multiple internal drive ratios may also be added. The addition of a jackshaft can also multiply the selection of ratios as well as assisting with chain tension control.

Since it is most desirable to always keep one's hands on the crank handles to provide constant propulsive force, gear selection control or shifting is especially important for those riders whose hands are already occupied in powering the vehicle. The shifters can be mounted near the crank handles for rapid access, or on the crank handles using long cables, pneumatics, or radio control.

Steering

Steering in the preferred embodiment occurs using conventional king-pins and steering-knuckles much like a car. Handle-bars can be mounted directly to the front wheel carriers or on a separate pivot with tie rods reaching to the steering arms.

In addition, other embodiments of the secondary steering system, depending on the rider's level of disability, are available. The control over the activation of the spring loaded clamp can be many different cable pulling systems, mounted wherever convenient. It can be electric, pneumatic, hydraulic, or radio controlled.

The hand cranks, though already rotatably mounted to the crank arms, can be given an additional pivotal axis of motion which can exploit a twisting of the rider's wrist to effect the actuator. In a similar manner, any available part of the rider's body, feet, mouth, head, etc. can be harnessed to activate the actuator. If the actuator is electrically powered, its control switches can be mounted anywhere on the vehicle. Through the use of slip-rings or radio control, the dexterity of the fingers can be exploited by mounting the control switches on the crank handles. Similarly, using pneumatics and hydraulics, the method of controling the actuator and the steering can be multiple and varied.

Additionally, there are advantages to utilizing a spring return to center feature to the steering. The sternum support, the telescopic actuator, and the handlebars are all possible locations for this useful, automatic self straightening feature.

Also, within the scope of this invention is a frame alone, adapted to receive conventional bicycle components to enable one skilled in the art to assemble an arm-powered vehicle.

Any combination of two, three, or four wheels may be used. Wheels and tire sizes, as evidenced by current bicycles, may be varied and multiple. Wheels and tires from a motorized racing kart, ATV, or lawn tractor may be used. To fit various sizes of rider, the present vehicle can be built to fit a small child or a large adult or any size in between. Versions can be built to accomodate multiple riders, as in a tandem bicycle.

More particularly, the disabled or paraplegic riders most likely to use this vehicle need extensive custom seating and sizing options. Padding and suspension at the wheels, handlebars, and seating are also often critical features to be designed according to the rider's level of disability. The present vehicle may also be foldable or collapsible to facilitate shipping, transporting, and fitting into small spaces such as doorways. Carrying handles, support straps, and restraining devices of many kinds may be fitted to enable assisting the disabled rider who is in the vehicle. Further options which are especially important for the disabled rider are, a parking brake, a reverse gear, and a neutral gear, to enable shifting gears while stationary. The severely disabled rider, with impared use of their hands, such as a quadraplegic, may make good use of wrist straps to keep their hands firmly connected to the crank handles. They may also need the shift-levers and/or the brake levers mounted on the crank handles.

Therefore the scope of the invention should not to be limited by the foregoing description, but should be determined by the appended claims and their legal equivalents.

I claim:

1. An arm-powered vehicle, comprising:
   a substantially horizontal frame having a front portion and a rear portion;
   at least one forward wheel pivotably and rotatably connected to said front portion of said substantially horizontal frame;
   at least one rear wheel rotatably coupled to said rear portion of said substantially horizontal frame;
   a rider support disposed on said substantially horizontal frame;
   a primary steering assembly comprising a pair of handlebars operatively connected to steer said one forward wheel;
   a pair of crank arms journaled to said front portion of said substantially horizontal frame;
   a pair of crank handles rotatably mounted to the respective ends of said crank arms;
   an actuator means for pivoting said forward wheel and having a forward end and a rear end, said forward end being operatively connected to said forward wheel; and
   a secondary steering mechanism operatively connected to said rear end of said actuator means.

2. The arm-powered vehicle of claim 1 wherein said rider support further comprises a sternum support.

3. The arm-powered vehicle of claim 2 wherein said sternum support is pivotably connected to said substantially horizontal frame and is operatively connected to said secondary steering mechanism.

4. The arm-powered vehicle of claim 1 wherein at least one of said pair of crank handles is arranged to operatively control said secondary steering mechanism.

5. The arm-powered vehicle according to claim 1 wherein said rider support further includes a substantially horizontal kneeling surface supported by said substantially horizontal frame.

6. The arm-powered vehicle of claim 1, wherein said vehicle has only one forward wheel, and only one rear wheel.

7. The arm-powered vehicle of claim 1, further including a drive linkage means operably connected from said pair of crank arms to said rear wheel.

8. The arm-powered vehicle according to claim 2, further comprising:
   a pivoting member pivotably connected to said substantially horizontal frame, said pivoting member having a top portion, a middle portion, and a bottom portion,
      said rear end of actuator means being operatively connected to said pivoting member; said sternum support being rigidly fastened to said top portion of pivoting member; said rotating powering means being rigidly fastened to said bottom portion of pivoting member;
      and a bushing surface concentric with said substantially horizontal frame, and said middle portion of pivoting member being concentric with said bushing surface.

9. An arm-powered vehicle, comprising:
   a substantially horizontal frame having a front portion and a rear portion;
   at least one forward wheel pivotably and rotatably connected to said front portion of said substantially horizontal frame;
   at least one rear driven wheel rotatably coupled to said rear portion of said substantially horizontal frame; a rider support disposed on said substantially horizontal frame;
   a primary steering assembly comprising a pair of handlebars operatively connected to steer said one forward wheel;
   a pair of opposed crank arms journaled to said front portion of said substantially horizontal frame and drivably connected to said rear driven wheel; each of said crank arms having an end,
   a pair of crank handles rotatably mounted to the respective ends of said crank arms;
   an actuator means for pivoting said front wheel and having a forward end and a rear end, said forward end being operatively connected to said front wheel; and
   a secondary steering mechanism operatively connected to said rear end of said actuator means.

10. The arm-powered vehicle of claim 9 wherein said secondary steering mechanism further comprises a sternum support pivotably connected to said substantially horizontal frame.

11. The arm-powered vehicle of claim 9 wherein said secondary steering mechanism is operably connected to said pair of crank handles.

12. The arm-powered vehicle of claim 9 wherein said rider support is comprised of said sternum support and a substantially horizontal lower support surface; said sternum support being linked to said substantially horizontal frame and extending outwardly therefrom, said sternum support lying above said substantially horizontal frame; said substantially horizontal lower support surface being linked to said substantially horizontal frame and extending outwardly therefrom.

13. The arm-powered vehicle of claim 9 wherein said vehicle has two forward wheels.

14. The arm-powered vehicle of claim 9 wherein said forward and rear driven wheels are 22 inches in diameter or less.

* * * * *